United States Patent [19]

Jamzadeh

[11] Patent Number: 5,448,266

[45] Date of Patent: Sep. 5, 1995

[54] METHOD AND APPARATUS FOR PLACING INFORMATION ON A MEDIUM WHILE COMPENSATING FOR DEVIATIONS IN IMAGE LENGTH

[75] Inventor: Feraydoon S. Jamzadeh, Fairport, N.Y.

[73] Assignee: Eastman Kodak Company, Rochester, N.Y.

[21] Appl. No.: 24,570

[22] Filed: Mar. 1, 1993

[51] Int. Cl.⁶ .................................. G01D 15/10
[52] U.S. Cl. ............................ 347/225; 324/177; 355/317; 347/129; 347/250
[58] Field of Search ............... 346/108, 160, 157; 324/177; 355/317

[56] References Cited

U.S. PATENT DOCUMENTS

| | | | |
|---|---|---|---|
| 3,321,705 | 5/1967 | Levitt | 324/177 |
| 3,344,418 | 9/1967 | Jones | 340/347 |
| 3,934,505 | 1/1976 | Kushner | 101/129 |
| 4,082,443 | 4/1978 | Draugelis et al. | 355/4 |
| 4,361,260 | 11/1982 | Hanlan | 226/30 |
| 4,712,118 | 12/1987 | Seto et al. | 346/108 |
| 4,779,944 | 10/1988 | Ritter et al. | 350/3.71 |
| 4,785,325 | 11/1988 | Kramer et al. | 355/8 |
| 4,786,919 | 11/1988 | Bidner et al. | 346/108 |
| 4,801,978 | 1/1989 | Lama et al. | 355/69 |
| 4,835,545 | 5/1989 | Mager et al. | 346/1.1 |
| 4,893,135 | 1/1990 | Jamzadeh | 346/108 |
| 4,922,266 | 5/1990 | Bidner et al. | 346/1.1 |
| 4,942,460 | 7/1990 | Inagaki et al. | 358/75 |
| 4,963,899 | 10/1990 | Resch, III | 346/157 |
| 4,972,208 | 11/1990 | Young et al. | 346/108 |

*Primary Examiner*—Benjamin R. Fuller
*Assistant Examiner*—Raquel Y. Gordon
*Attorney, Agent, or Firm*—Dennis R. Arndt

[57] ABSTRACT

Endless web or drum type laser printers have enhanced copy registration. Image frame length control has particular utility in a printing or reproduction apparatus that writes one or more images on a photosensitive media that is driven by a low cost synchronous hysteresis A.C. motor. The power line frequency is monitored and compared to a precision crystal clock. When the frequency is lower than specification and the motor slows down the number of scan lines are increased by repeating them to lengthen the image frame. When the power line frequency is higher than specification, the number of scan lines per image frame are decreased by deleting scan lines to shorten the image frame.

9 Claims, 5 Drawing Sheets

METHOD AND APPARATUS FOR PLACING INFORMATION ON A MEDIUM WHILE COMPENSATING FOR DEVIATIONS IN IMAGE LENGTH

BACKGROUND OF THE INVENTION

1. Field of the Invention

This invention relates, in general, to laser printers and, more specifically, to registration enhancing systems for hard copy scanning printers, including laser printers.

2. Description of the Prior Art

In some applications, the location of the printed image upon the hard copy or sheet material on which the printed image is produced is not critical to acceptable operation of the printer. Generally speaking, precise printers, such as laser printers, which are used to produce a single copy of an image, perform satisfactorily if the image is registered on the hard copy paper within a fraction of an inch of the true registration position. However, with more and more printers using images stored in digital memory to construct the image on the hard copy material, more precise control of the location of the image is possible than with optical-type duplicators and copiers.

Registration is particularly important when the printer is being used in some fashion for color printing or reproduction. In many color printing systems, several colors are printed separately on top of each other to form a composite color image. In order to have a good quality color image, it is necessary that the individual colors be aligned or registered very accurately on the printed paper. Color registration which is off just a very small fraction of an inch will produce color images that are not acceptable to present standards. Precise registration is also desired for machines which make masters to be used in color printing operations. With the resolution of such machines being greater, in some cases, than 1,000 lines/inch, the opportunity exists for producing very sharp composite color images if the registration between the different color masters is properly maintained.

A lack of registration in laser printers occurs for a variety of reasons. One of the reasons involves synchronization of the laser scanning beam with the surface onto which the beam is focused. One type of currently available laser printer uses a photoconductive web material constructed in an endless belt configuration which rotates around rollers to move the latent image created by the laser beam through the other stations of the printer to eventually produce the hard copy output. With this type of printing system, the scanning of the laser beam must be coordinated with the speed and the position of the drum and with the electronic control of the modulation, or illumination control, of the laser beam. Typically, such systems include a means for scanning the laser beam linearly across the web surface to form one line of the image at a time. Successful line scans are used to construct an entire image on the web. Normally, the web is moving to provide a displacement from line to line, and the laser beam moves from one end of the line to the other end of the line.

Many printers operate with the location of the beam and the location of the laser beam on the scan line, not always synchronized to each other. In other words, when the web is in position to receive the image to be constructed by the laser beam, the laser beam may be already oriented to scan somewhere within the line. Since the scan is always started at the beginning of the line, a delay is necessary before the scan is commenced. The amount of delay depends upon the position of the laser beam within the line when the images to be started. Starting of the image does not occur until the laser beam returns to the edge of the web and trips or is detected by a photodetector which signifies that the laser beam is in a position to start accepting image information which will be written or imaged onto the photoconductive web. As a result, it is possible, at a worst case analysis, that the laser beam will just have passed the edge detector when it is to start writing an image on the web. Since the image does not start writing until the laser beam scans the entire line, it starts again at the edge, significant misregistration on the web can occur. In this case, the image written onto the web can be misregistered by an amount equal to the width of one scan line. When the printer is used to make masters for multicolor printing processes and to make color prints, this type of misalignment in the registration between the various color masters or the print layers produces undesirable copies, or prints.

Even monochrome reproductions that are not intended for use in composite images may require accurate reproduction of finely-spaced lines or other minute, repetitive image components. Such components in a detailed original (for example, a map or chart) must be reproduced with fidelity to the original image. Non-uniformity in the writing of the latent image on the media can cause a noticeable image degradation: a finely-ruled rectangular grid in a reproduction of an image will appear uneven in thickness and spacing; a reproduction of an image having a gray-scale pattern will have noticeable density grating and variations as well.

In a web-base reproduction or printing apparatus, the web is typically supported by several free turning rollers and driven by one drive roller. This roller, in turn, is driven by a motor. (An alternative reproduction apparatus, a driven drum assembly, is substituted for the web and rollers.) Because these driving assemblies are electro-mechanical systems, there is a tendency for the web (or drum) to vary in speed as it is driven. Typically, a low-cost synchronous motor will vary in speed as the line frequency varies. Moreover, because the web or drum is photosensitive, it typically is exposed line by line by a laser beam or linear LED array, any speed variations of the media will cause the exposure lines to be written at different inter-line spacing. The sum of this effect is that different image frames on the photosensitive medium will have images of different length. Those image frames, when developed and transferred, will produce reproductions with correspondingly disparate frame length.

In the production of a latent image frame, any speed variation of the photosensitive medium must be held to a minimum; otherwise the success of latent image frames are likely to have different lengths. The resulting misregistration of the developed and transferred image frames must be held within acceptable limits. Most variations in web speed are caused by a variety of mechanical factors which effect the web transport speed, such as roller bearing or drive motor friction, line voltage changes, line frequency changes, asymmetry of the drive motor poles or misalignment of the apparatus support chassis with respect to the axis of the web transport rollers and the drive means. Much improvement has been made in the an to reduce such gross speed variations to a level that is acceptable for most printing and reproduction applications. However, as a motor is controlled more and more accurately, the cost of this exacting motor speed control can become prohibitive. As an alternative, a low cost synchronous motor can be used to drive the photoconductor and compensation in the scanning of the laser be made to compensate for speed variations in the photoconductor.

In the past to accomplish low flutter, operator D.C. servo motors were used. Not only were the motors themselves expensive, but they required costly control systems. They also required very clean, high current and low voltage power supplies to operate properly. Not only was this expensive, but was large and bulky.

In Mager et al U.S. Pat. No. 4,835,545, a photosensitive media moving in a first direction, relative to a laser light beam scanning in a second direction, incurs velocity variation which cause variations in the absolute and relative heights of white and black image features. An instantaneous velocity error calculation is used to adjust the intensity of the laser light beam to be proportionately brighter (dimmer), exposing a wider (narrower) scan line, on a faster-moving (slower-moving) media region.

In Hoshino et al U.S. Pat. No. 4,803,515, an image-forming apparatus includes movable image-bearing member and a driver for driving the image-bearing member. The time interval required for the image-bearing member to move from a latent image-forming position is an integer multiple of a period of the drive non-uniformity inherent in the driver.

In Lama et al U.S. Pat. No. 4,801,978, a control circuit is provided in an electronic printer utilizing an image write bar to compensate for the effects of vibration in a rotating photoconductive member.

In Kramer et al U.S. Pat. No. 4,785,325, a document imaging system incorporates a mechanism for adjusting the speed ratio between the document scanning system and the photoreceptor.

In Ritter et al U.S. Pat. No. 4,779,944, an integrated laser scanning system for scanning a modulated beam across an image surface (receptor) is provided. The variation in rotational speed of the receptor is discussed as a major source of scan line spacing error in images recorded with the laser scanner.

In Hanlan U.S. Pat. No. 4,361,260, a register control is provided for a web handling apparatus wherein a control provides a time and modification to a sensed speed signal for providing a modified speed command signal when the system is out of registration.

In Draugelis et al U.S. Pat. No. 4,082,443, digital logic circuitry insures that latent images are correctly placed on the photoconductor, by varying the time of the flash assembly.

In Kushner U.S. Pat. No. 3,934,505, a method and apparatus are disclosed wherein a signal proportional to the speed of a moving web is compared with a signal proportional to the speed of a motor-driven rotary printing member, and a resultant corrective signal is transmitted to the controller for the motor, the linear speed of the rotary printing member is thus made equal to the web speed.

Young et al U.S. Pat. No. 4,972,208 teaches a method and apparatus for image frame length control in a scanning apparatus employing a driven photosensitive media having a median thickness and variations therefrom. The method comprises the steps of storing a profile with thickness variations of a photosensitive media, receiving image information, rotating the media to provide a location for creation thereon of a latent image frame according to the received image information, calculating the predicted frame length of the latent image according to the thickness profile and the image frame location, offsetting an imagewise exposure of the media by an interval proportional to one-half of the disparity between the predicted image frame length and the correct image frame length, and imagewise exposing the media on a line-by-line basis according to the stored image information to create a latent image thereon. The latent image frame length is thus corrected with respect to the predicted frame length.

Jamzadeh U.S. Pat. No. 4,893,135 discloses an apparatus and method to enhance the registration of laser printers using endless web-type or drum photoconductive surfaces. The enhancement is provided by delaying the feeding of paper into the image transfer station by the amount of time the latent image is delayed in scanning at the exposure station due to the position of the laser beam when scanning was to begin. A start-of-page (SOP) signal is provided by the location of the web and indicates that the web is in a position to accept laser scanned images thereon. Circuitry is included to determine the time difference between the receipt of the start-of-page signal and the receipt of the start-of-line (SOL) signal which is activated by the laser beam when it returns to the edge of the web to begin starting the scan of a new line. This delay can be as much as one full line of the laser beam as just started scanning a line at the time the start-of-page signal was issued. The delays between the two signals are convened to counts which are then converted to time delays that are used to extend or delay the conventional signal issued by the master system controller to feed paper into the transfer region.

SUMMARY OF THE INVENTION

It is an object, therefore, of the invention to provide a method and apparatus for correcting the above-described media transport speed variations in a scanning, printing or other reproductive apparatus.

Use of lower cost synchronous motors instead of more costly D.C. servo motors for the drive system results in considerable savings in the drive system as well as reduced complexity can be realized. In order to compensate for changes in line frequency to the synchronous motor which induces similar speed changes in the media transport speed, power line frequency shifts are monitored using a local precision clock. When line frequencies are shown to be less (shorter separations), image lines are repeated to lengthen the separation. When line frequencies are increased and the motor runs too fast (a long separation), image lines are dropped to shorten the separation. Accordingly, the end results are separations in prints with good registration and precise length produced on an apparatus using a low-cost synchronous motor drive system.

The present invention provides a method for image frame length control in a scanning apparatus employing a photosensitive media driven by a synchronous motor to provide a movable photosensitive surface comprising the steps of receiving image information and monitoring the power line frequency. A modulated light beam is scanned across the photosensitive surface on a line-byline basis as the surface is moving to generate an image frame of predicted length according to the received information. By using a precision clock to compare power line frequency shifts to determine changes in the motor speed. The number of scan lines per image frame are adjusted based on the changes in power line frequency and the motor speed charges associated therewith. Accordingly, the latent image frame is adjusted with respect to the predicted frame length. The step of adjusting includes increasing the number of scan lines per image frame by repeating scan lines to lengthen the latent image frame when the power line frequency is reduced and the motor speed is slowed; and decreasing the number of scan lines per image frame by deleting scan lines to shorten said latent image frame (when the power line frequency increases).

BRIEF DESCRIPTION OF THE DRAWINGS

Further advantages and uses of this invention will become more apparent when considered in view of the following detailed description of the drawings in which.

DESCRIPTION OF THE PREFERRED EMBODIMENTS

The apparatus of the preferred embodiment will be described in accordance with an electrostatographic recording media. The invention, however, is not limited to methods and apparatus for creating images on such media, as other photosensitive media such as photographic film, etc., may also be used to advantage within the spirit of the invention. Because electrostatographic reproduction apparatus are well known, the present description will be directed, in particular, to elements forming part of, or cooperating more directly with, the present invention. Apparatus not specifically shown or described herein are selectable from those known in the prior art.

Figure 1A:
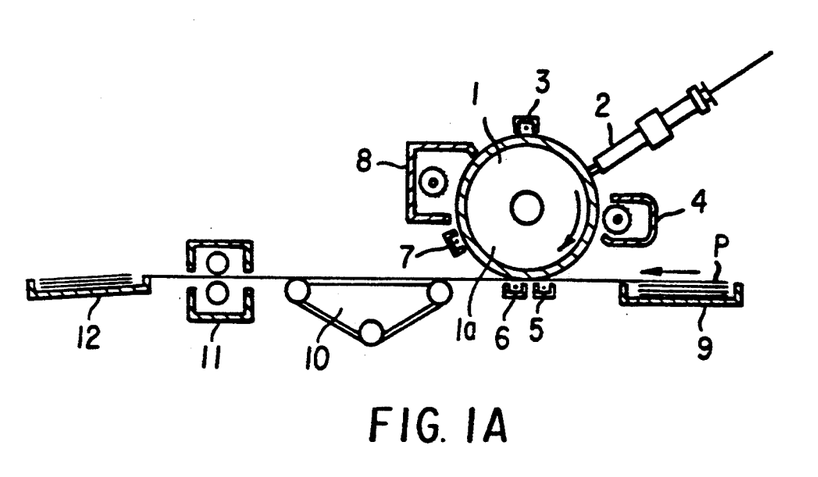
FIGS. 1A and 1B is a schematic view of the scanning and exposure portion of the printer according to the present invention.

FIG. 1A illustrates an information recording apparatus in accordance with the present invention and includes a revolving drum 1 having a photosensitive substance 1a wherein selenium as photoconductive material is evaporated on the surface thereof. The apparatus further comprises a scanning reproducing device 2 for forming optical images on photosensitive substance 1a in response to received electrical information signals, a charger 3, a developing unit 4, a transfer electrode 5, a separation electrode 6, a neutralizing electrode 7 and a cleaning unit 8 arranged successively about the revolving drum 1 in teh direction of its rotation. There is additionally provided a sheet feeding tray 9 for holding recording sheets and synchronously supplying them one by one during the recording operation, a paper conveyance unit 10 for transporting the recording sheets after image transfer, a fixing unit 11 for fixing developed images in the recording sheets, and a sheet delivery tray 12 for receiving the fixed recording sheets. The scanning reproduction device 2 may comprise, by way of example, an optical fiber tube, a thin .wall tube, or a laser beam scanning device.

Figure 1B:
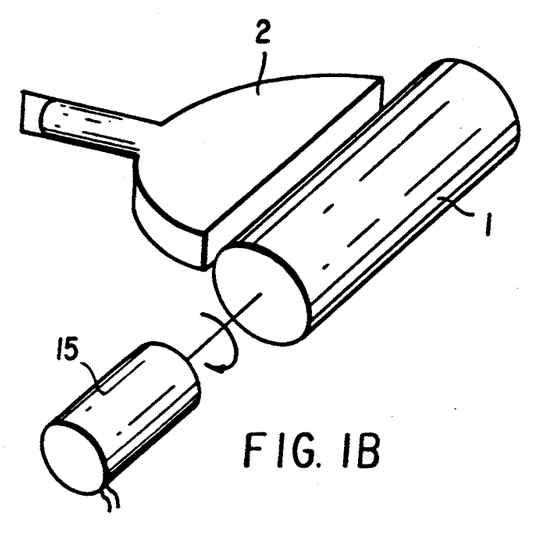

FIG. 1B illustrates in more detail the scanning reproducing device and the revolving drum 1 which is driven by a synchronous hysteresis motor 15 connected to the A.C. power line. Synchronous hysteresis motors are available at low cost and are commonly used in many industrial applications. This type of motor does not require a power supply or controller because they operate directly from power outlets for either 110 volts, 60 Hertz or 220 Volts, 50 Hertz. Accordingly, the use of this type motor can dramatically reduce the cost of this system.

Figure 2:
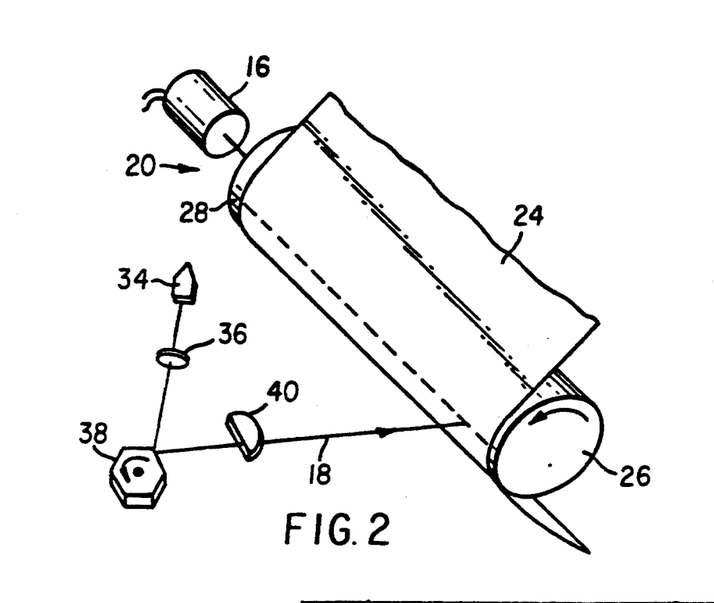
FIG. 2 is a schematic view of another embodiment of the scanning and exposure portion of a printer according to the present invention.

FIG. 2 is a view of the exposure station in another embodiment of the present invention. The printer may include the laser scanner 20 which emits a laser beam 18. Normal non-laser light sources can also be used. A photoconductive surface or web 24 is constructed in an endless loop and disposed around rollers (not shown) and is rotated by synchronous motor 16 in the direction indicated by arrow 26. During the operation of the printer, the web 24 travels across drive roller 28 and is exposed, line-by-line, by the laser beam 18 which is controlled by suitable electronics to construct the desired image on the web 24. The latent image moves, with the movement of the web 24, through other stations (not shown) of the printer, including the development station where the toner is applied to the web 24. At the transfer station, the developed image on the web 24 is transferred, with the aid of a transfer roller to a sheet of paper or other suitable hard copy material.

The laser scanner 20 includes the laser 34, the line 36, the rotating mirror 38, and the lens 40. Actual operating exposure stations may contain more and different types of lenses for a particular application, but the arrangement shown in FIG. 2 is illustrative of the invention and is simplified in the interest of clarity.

The beam of light produced by the laser 34 would be modulated in the manner necessary to provide the information on the scanned line. The modulation of the laser 34 is performed and controlled by associated electrical circuitry not shown. Although the modulation may be in the form of being either completely on or off by applying low and high voltage to the laser diode, other forms of modulation may be used. The laser beam could be modulated in an analog fashion for the purpose of creating different levels of intensity impinging upon the photoconductive web 24 by using a suitable modulator, such as an acousto-optic cell.

Figure 4:
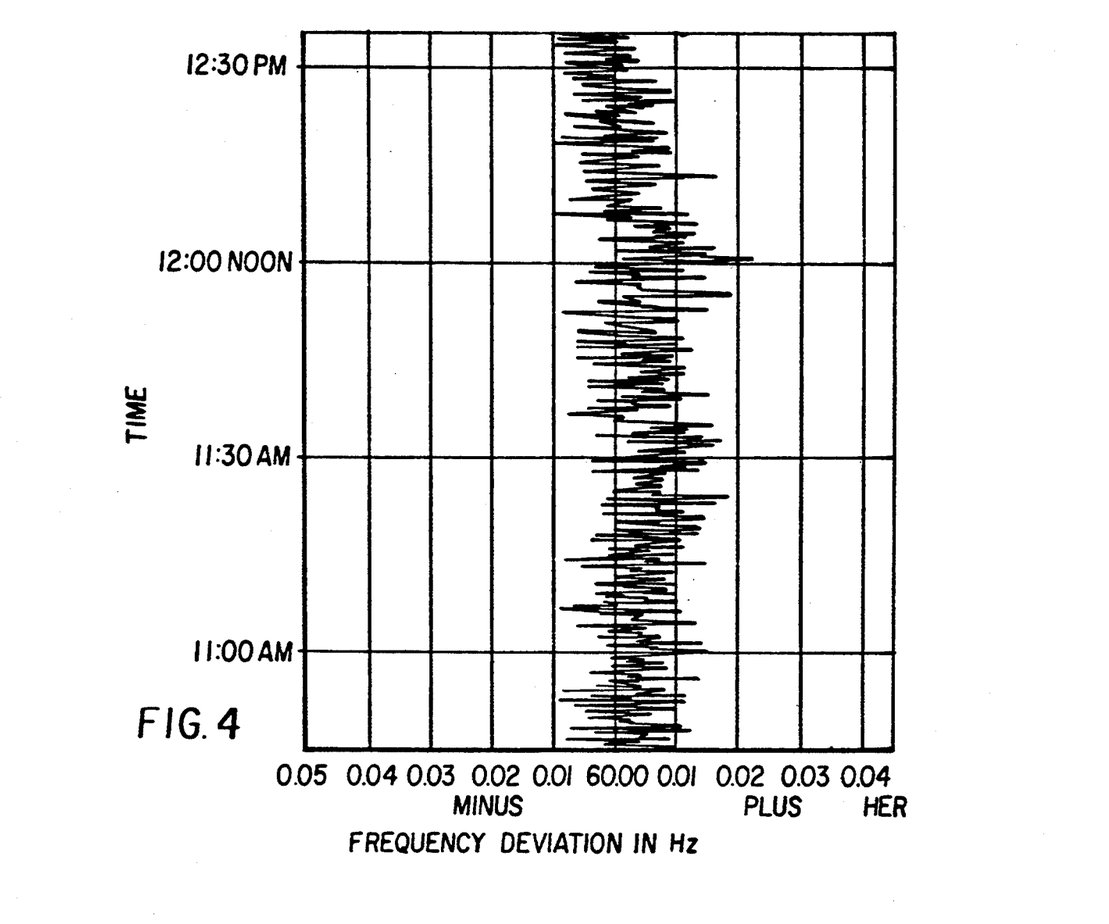
FIG. 4 is a frequency deviation chart showing the frequency deviation found of a typical power grid over a one-hour time span.

A problem with using synchronous motors is the occasional swings of the power grid frequency. FIG. 4 shows the frequency listing of a typical power grid over a one-hour time period. The basis of the present invention is how to account for these power grid frequency shifts and correct for them so that they have no affect on the image.

When synchronous motors are used, the shifts in the power line frequency are monitored with a local precision clock. When the line frequency shows that the separation tends to become shorter, image lines are then repeated to lengthen the separation. Likewise, when the line frequency increases, the separations are lengthened, image lines are then dropped to shorten the separation.

The result is separations and prints having good registration and precise lengths maintained even though they were produced using a low cost synchronous drive system for the photoconductive drum or belt.

Figure 3:
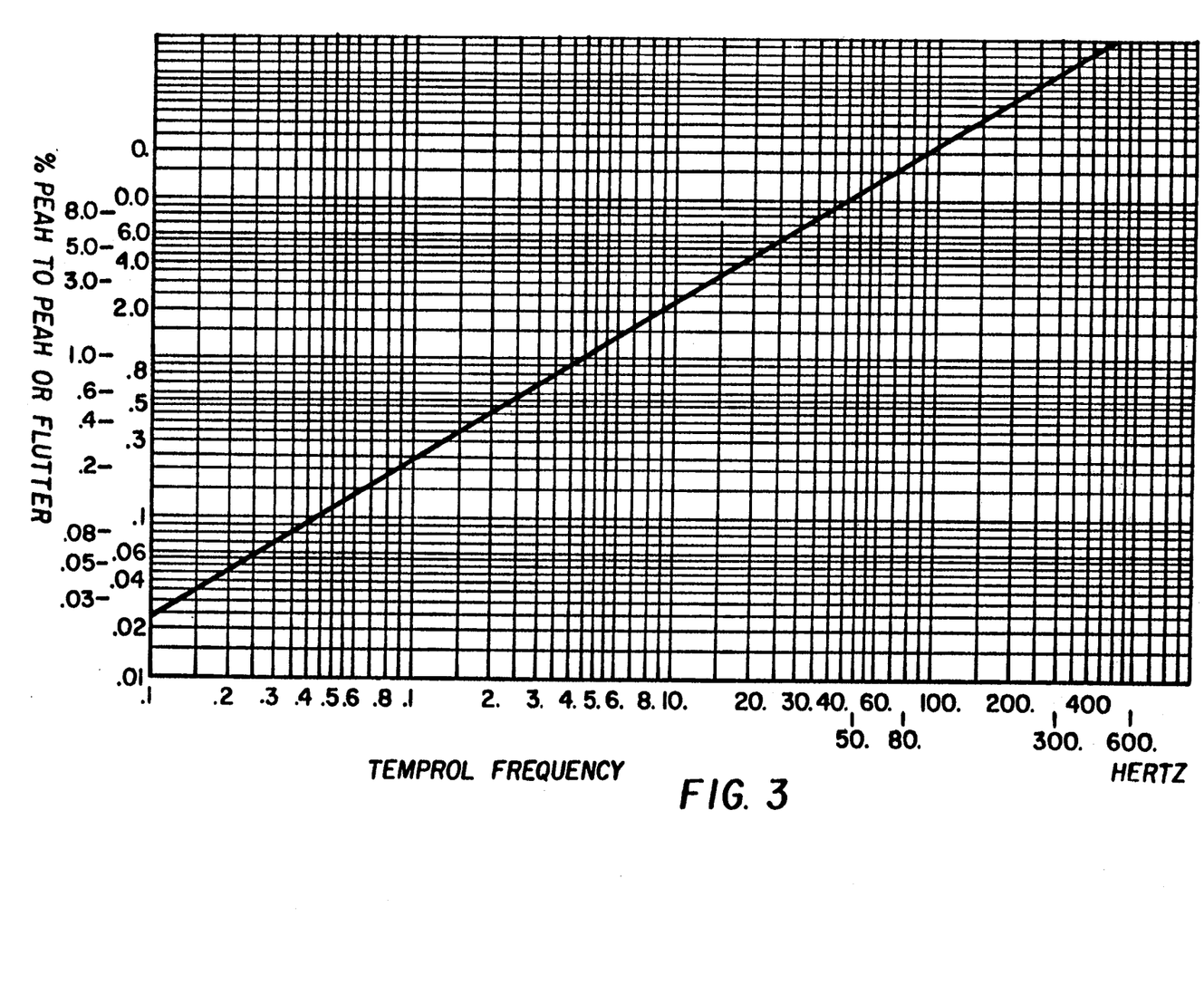
FIG. 3 is a graphic illustration of % of peak to peak registration or flutter vs. temporal frequency in Hertz with the straight line corresponding to the registration specification, with the degree of precision determined by the registration tolerance.

For example, in a high quality printing system where each 12×18" separation consists of 9000 raster lines at 500 dpi writing resolution. FIG. 3 graphically illustrates the registration of multiple separations and their lengths caused by shifts in the frequency of the power grid. The far left of the line, 0.02% flutter at 0.1 Hz, indicates that the lengths of the separation could be 18.0015" and the shortest separation 17.9985".

In FIG. 3 the straight line corresponds to the registration specification and is based on the fact that each color separation must be superimposable on top of the other separations in a precise fashion. The degree of precision is determined by the registration tolerance. If one were to establish registration to be set at 0.003" total. That means that, no point of any, color separation could be off by more than 3 mils. This obviously applies to separation length and means that the cyan separation image length can not be longer or shorter than the magenta or yellow separations by more than 3 mils. Because the length of the image was established at 18", the above specification would correspond to the point the curve with 0.1 Hz and 0.025% coordinates in FIG. 3. In a similar manner, this applies to fractions of each separation length, i.e., the mid-sections of each separation should be super-imposed on top of others with position errors no more than 3 mils. Therefore, the half-length separation, of 9" long, could not be longer or shorter than 9" by 3 mils. This specification corresponds to a point on the curve in FIG. 3 with coordinates of 0.2 Hz and 0.05%. This logic applies to any image-length fraction, i.e., ¼, ⅛,1/1000, 1/1234 etc. The final result is a straight line in log-log space as can be seen in FIG. 3. The performance of this drive system must remain on or below the line in FIG. 3 to meet the registration specifications.

Thus, if one were to use synchronous motors as the prime mover of the drive system without any correction, the specification for length would be violated where the frequency swings more than 0.012 Hertz from 60 Hertz, this would not satisfy 0.02% flutter desired.

Figure 5:
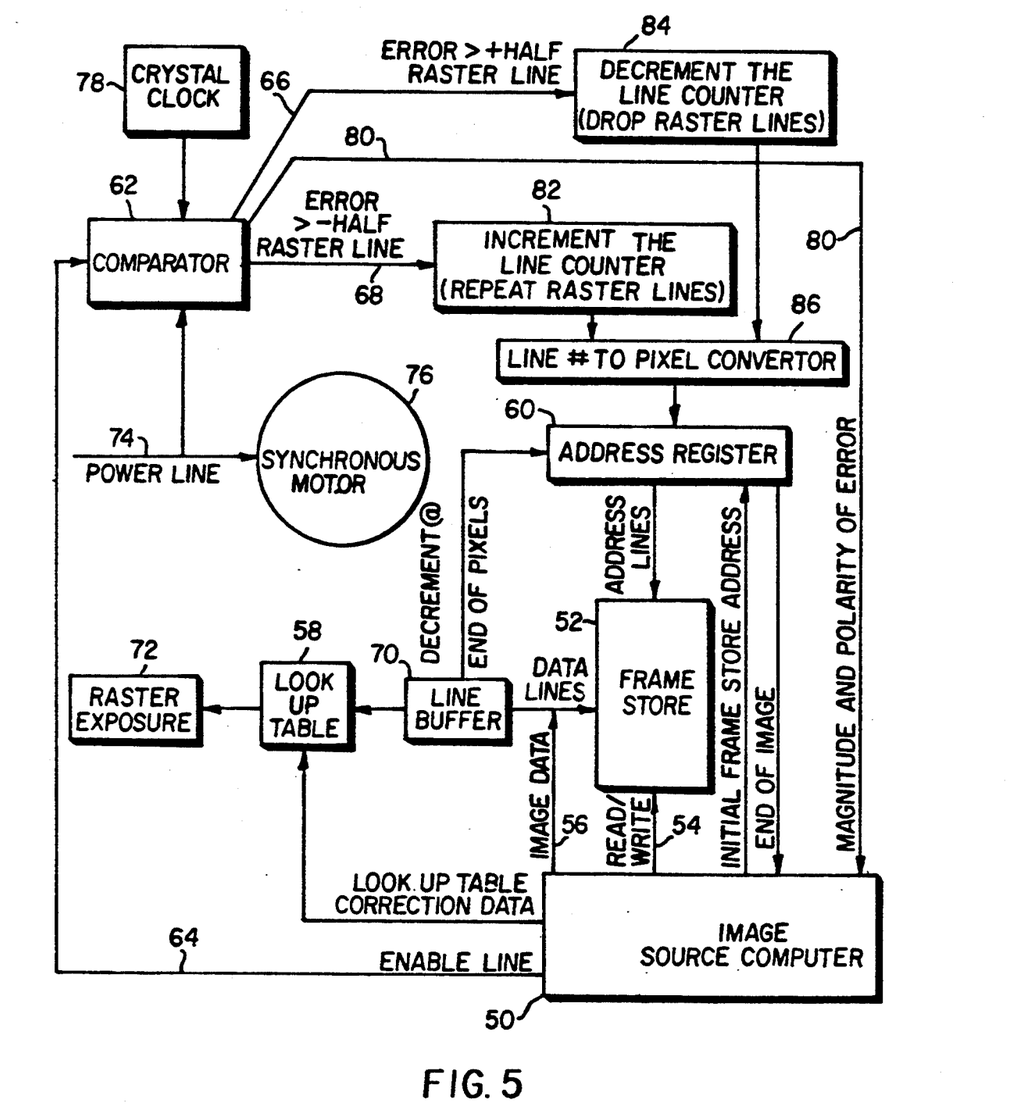
FIG. 5 is a block diagram illustrating a circuit arrangement for implementing the invention.

FIG. 5 illustrates a block diagram of the system used to control the separation length when the line frequency changes. In general, the power line frequency is compared against a local low cost crystal clock. The output is compared with the system line resolution of a maximum of 3 mils or 1.5 raster lines at 500 dpi as established above.

When the frequency goes down, so does the drive output velocity. This means shorter separations. The system corrects for it by repeating raster lines and lengthening the separations. This is achieved by modifying the contents of the data path line counter. The line counter is set to 9000 at the start of each 18" separation. Its content is normally decreased by one with the exposure of each raster line. Therefore, when a line is exposed and the line counter is not discussed, the same raster line is exposed again. Conversely, when the line frequency increases, the separation length increases. If the extra length is more. This makes the data path skip over one or more raster lines thereby reducing the image length.

This concept applies to all raster imaging systems that make multiseparation images. It includes color printers/copiers as well as master making devices. These are devices that produce color masters on separate receivers. The masters are used later on a secondary color reproducing device (for example, printing presses) to make color prints.

A detailed description of the block diagram will be given next. The image source computer 50 initially loads the frame store 52 with image data. This is done by selecting the address of the frame store and selecting the read/write line 54 and sending data on the image data line 56. This is done for all the pixels in the image. Image source computer 50 will next load the look-up table 58 with the proper exposure corrections. Image source computer 50 then loads the address register 60 with the address of the first pixel of the first image (separation).

Image source computer 50 begins the imaging process by selecting frame store 52 into the read mode and enabling the comparator 62 via enable line 64 to generate error signals on either line 66 or line 68. During the exposure process, pixels of each line are read (clocked) from frame store 52 into the line buffer 70. Line buffer 70 may include further image processing and filter circuits. Line buffer 70 signals the address register 60 after receiving each pixel of data thereby allowing frame store 52 to send out the next pixel.

Look-up table 58 modifies the value of each data point according to its original value, the color of the separation, the condition and status of the system. It allows for contrast and lightness control of the image data before it is sent to the raster exposure subsystem 72.

When image generation begins, the power line 74 is applied to synchronous motor 76 directly to provide the necessary photoconductor motion which could take the form of a belt or drum as discussed above. Once enabled, the comparator 62 at intervals equivalent to the exposure period of raster lines, monitors the power line frequency variations with respect to a very stable crystal clock 78. The magnitude and polarity of the signal is sent from comparator 62 on line 80 to image source computer 50 to establish the absolute error signal and its polarity (too fast or too slow). Image source computer 50 will modify the contents of look-up table 58 accordingly so as to make the proper exposure once the corrections based on the frequency shift of synchronous motor 76 to be discussed in detail below.

Comparator 62 determines if the error at each sampling, interval is large enough to warrant a corrective action. The corrections could be in one of two directions. If power line 74 frequency is too high, the synchronous motor 76 would run too fast and the image length would be too long. In this case, the correction would occur on line 68 to increment the line counter in box 82 to drop or eliminate some image raster lines. The image source computer 50 will modify the contents of the look-up table 58 such that heavier exposure is produced by the raster exposure subsystem 72 because fewer lines will expose the same areas on the photoconductor. If the frequency of power line 74 is too low, synchronous motor 76 would run too slow and the image length would be too short. In this case, the correction would occur on line 66 to decrement the line counter in box 84 thereby repeating some image raster lines. Image source computer 50 modifies the contents of the look-up table 58 accordingly such that lighter exposure is produced by the raster exposure subsystem 72 because more lines will expose the same area on the photoconductor.

The line number to pixel converter in block 86 simply converts the number of image lines to be shipped or repeated into its equivalent in number of pixels. This way the correction information can be applied directly to the address register 60. When address register 60 is decremented to zero, the image (separation) exposure is complete and the process stops until the next image (separation).

Figure 6:
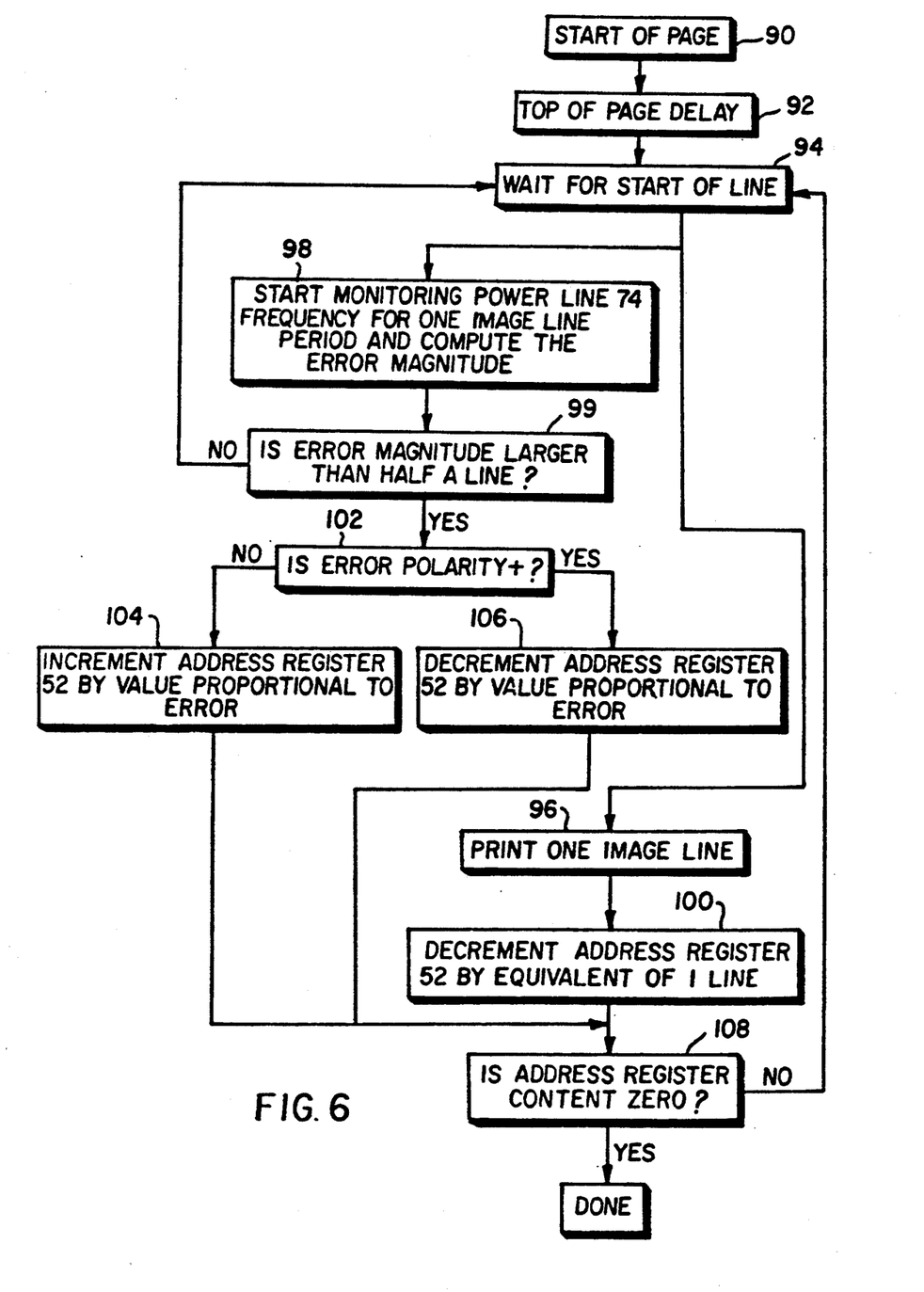
FIG. 6 is a flow chart illustrating a method of implementing the invention using microprocessor control.

FIG. 6 illustrates a flow chart for the image length correction process described above. After the SOP (start of page) signal is received as set forth in step 90, there is a delay that allows for the top margin of the image on the sheet. After the delay period expires as shown in step 92, the first SOL (start of line) signal will begin the imaging process as shown in step 94.

The printing of a line of the image begins as shown in step 96 and at the same time, power line frequency monitoring beings for one image line period and the magnitude of the error is computed according to step 98. After one line of image is exposed, the memory (frame store) address 52 is moved to the beginning of the next line according to step 100. If the error magnitude computed box 98 is larger than half a line equivalent step 99, its polarity is defined in step 102 and the proportional correction is applied to the memory address by either step 104 or step 106 whichever is appropriate based on the polarity determination made in step 102. If the memory address has reached the end of storage area as shown by step 108, the separation exposure is finished and we will wait for the next SOP. If the memory address has not reached zero step 108 the process jumps back to step 2 and the system will wait for the next SOL step 94.

The apparatus and method disclosed herein permits the construction of a reproduction of an original document with great fidelity. Reproductions that are to be used singly, as in non-color applications, will have more uniform image length and line spacing. Reproductions that are to be used as color separations will combine with improved color registration in the composite print. This fidelity and registration accuracy may be implemented in any line-scanning printing or copying apparatus.

I claim:

1. A method for image frame length control in a scanning apparatus having a predicted number of scan lines per latent image frame length at a given motor speed, said apparatus employing a photosensitive media driven by a synchronous motor powered by a known nominal power line frequency to provide a movable photosensitive surface comprising the steps of:
   receiving image information on a line-by-line basis;
   monitoring the power line frequency;
   scanning a modulated light beam across said photosensitive surface on a line-by-line basis as the surface is moving to generate a latent image frame of predicted length according to the received image information;
   monitor a reference clock;
   compare the power line frequency shifts to said reference clock to determine changes in the speed of the motor; and
   adjusting the number of scan lines per latent image frame based on a change in power line frequency and motor speed change whereby the scan lines per latent image frame length are adjusted with respect to the predicted frame length.

2. An image frame length control as claimed in claim 1 wherein the step of adjusting comprises increasing the number of scan lines per latent image frame by repeating scan lines to increase the number of scan lines per latent image frame when the power line frequency is reduced and the motor speed is slowed and decreasing the number of scan lines per latent image frame by deleting scan lines to shorten said latent image frame when the power line frequency is increased.

3. An image frame length control as claimed in claim 1 when the power line frequency increases and the latent image frame length increases by more than half a scan line, the scan lines per image frame are reduced by one or more.

4. An image frame length control as claimed in claim 1 when the power line frequency decreases and the latent image frame length decreases by more than half a scan line, one or more scan lines per image frame are repeated.

5. An image frame length control as claimed in claim 1, the number of scan lines per latent image frame and the predicted number of scan lines per latent image are always within ± a half a scan line.

6. An image recording apparatus having image frame length control with a recording medium driven by a synchronous motor to provide a movable recording medium, said apparatus comprising:
   a recording member having one or more recording elements for recording image information on the recording medium:
   means for receiving image information;
   means responsive to said image information for modulating the recording member having one or morn recording elements for recording on the medium on a line-by-line basis as the medium is moving to generate an image frame of a predicted length according to the received image information;
   means for receiving the output of a precision clock;
   means for generating a signal representing power line frequency to the synchronous motor; and
   means responsive to the signal for adjusting the number of scan lines per image frame based on changes in power line frequency whereby the latent image frame length is adjusted with respect to a predicted frame length.

7. A scanning apparatus having image frame length control as claimed in claim 6 wherein the means for adjusting comprises increasing the number of scan lines per image frame by repeating scan lines to lengthen said image frame when the power line frequency is reduced and the motor speed is slowed and decreasing the number of scan lines per image frame by deleting scan lines to shorten said image frame when the power line frequency is increased.

8. A scanning apparatus having image frame length control as claimed in claim 4 when the power line frequency increases and the image frame length increases by more than half a scan line, the scan line count is reduced by two or more.

9. A method for image frame length control in an image recording apparatus employing a recording medium driven by a synchronous motor to provide a movable recording medium comprising the steps of:
   receiving image information on a line-by-line basis;
   modulating in response to said image information a record member having one or more recording elements for recording on the medium on a line-by-line basis as the medium is moving to generate an image frame of a predicted length according to the image information received;
monitoring the output of a reference clock;
generating a signal representing a change in power line frequency to the synchronous motor; and
adjusting the number of scan lines per image frame in response to said signal based on changes in power line frequency whereby the image frame length is adjusted with respect to a predicted frame length.

* * * * *